(12) United States Patent
Maeda et al.

(10) Patent No.: US 9,463,936 B2
(45) Date of Patent: Oct. 11, 2016

(54) SORTING SYSTEM AND SORTING METHOD

(71) Applicant: KABUSHIKI KAISHA TOSHIBA, Tokyo (JP)

(72) Inventors: Masaya Maeda, Kanagawa-ken (JP); Yuka Watanabe, Tokyo (JP); Tomoyuki Hamamura, Tokyo (JP); Bunpei Irie, Kanagawa-ken (JP); Akira Sawada, Tokyo (JP); Kenji Baba, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 219 days.

(21) Appl. No.: 14/272,697

(22) Filed: May 8, 2014

(65) Prior Publication Data

US 2014/0336816 A1    Nov. 13, 2014

(30) Foreign Application Priority Data

May 9, 2013  (JP) ................................ 2013-099633

(51) Int. Cl.
    G06F 7/00       (2006.01)
    B65G 47/46      (2006.01)
    B07C 3/00       (2006.01)
    B07C 5/00       (2006.01)

(52) U.S. Cl.
    CPC ................. *B65G 47/46* (2013.01); *B07C 3/00* (2013.01); *B07C 5/00* (2013.01)

(58) Field of Classification Search
    USPC ........................................................ 700/230
    See application file for complete search history.

(56) References Cited

U.S. PATENT DOCUMENTS

| 4,275,293 A | * | 6/1981 | Chambors | G06K 13/067 250/223 R |
| 2002/0123855 A1 | * | 9/2002 | Mangiameli | G06Q 10/06 702/128 |
| 2005/0025340 A1 | * | 2/2005 | Hickman | B07C 3/00 382/101 |
| 2012/0037545 A1 | * | 2/2012 | Van Kasteren | B07C 5/3422 209/577 |
| 2012/0209741 A1 | * | 8/2012 | Bonner | G06Q 30/08 705/26.3 |

FOREIGN PATENT DOCUMENTS

| EP | 2418020 A2 | 2/2012 |
| JP | 3351495 B2 | 11/2002 |
| JP | 2008-170611 A | 7/2008 |

OTHER PUBLICATIONS

Extended European Search Report issued in related European Patent Application No. 14167632.0 mailed Feb. 2, 2015, 5 pages.

* cited by examiner

*Primary Examiner* — Kyle Logan
(74) *Attorney, Agent, or Firm* — Baker Botts L.L.P.

(57) ABSTRACT

A sorting system is provided with conveying section, distance detecting section, article detecting section, determining section, acquisition section, and sorting section. The conveying section conveys an article. The distance detecting section acquires distance data indicating a distance, from above the conveying section, from the distance detecting section to an object included in a detection area including an area through which the article conveyed by the conveying section passes. The article detecting section detects one or a plurality of the articles based on the distance data. The determining section determines, when a plurality of the articles are detected, whether a plurality of the articles are sortable. The acquisition section acquires sorting information of the article.

2 Claims, 7 Drawing Sheets

SORTING SYSTEM AND SORTING METHOD

CROSS-REFERENCE TO RELATED APPLICATION

This application is based upon and claims the benefit of priority from the prior Japanese Patent Application No. 2013-099633, filed on May 9, 2013, the entire contents of which are incorporated herein by reference.

FIELD

An embodiment of the present invention relates to a sorting system and a sorting method.

BACKGROUND

A sorting system to sort an article that is a delivery object is known. The sorting system detects passing of an article which is conveyed and sorts the article, based on address information and so on read out from the article. A transmission type optical sensor is used for detection of passing of an article. The transmission type optical sensor can detect a plurality of articles which are conveyed in line along a conveying direction at intervals not less than a prescribed length one by one.

Sometimes, the sorting system cannot detect a plurality of articles which are conveyed obliquely in line one by one. That is, the sorting system cannot find a separation position between a plurality of the articles which are conveyed obliquely in line, and may detect a plurality of the articles as one article. In such a case, if a sorting bar code or a delivery destination address is recognized from only one article out of a plurality of the articles, the plurality of the articles is erroneously sorted as one article. That is, the plurality of the articles is collectively sorted into one shooter erroneously.

When a plurality of articles cannot be sorted into separate sorting destinations, the recognition processing of a previous stage thereof runs to waste. That is, the inefficient utilization of computation resources is generated.

EMBODIMENTS TO PRACTICE THE INVENTION

A sorting system according to an embodiment is provided with conveying section, distance detecting section, article detecting section, determining section, acquisition section, and sorting section. The conveying section conveys an article. The distance detecting section acquires distance data indicating a distance, from above the conveying section, from the distance detecting section to an object included in a detection area including an area through which the article conveyed by the conveying section passes. The article detecting section detects one or a plurality of the articles based on the distance data. The determining section determines, when a plurality of the articles is detected, whether a plurality of the articles is sortable. The acquisition section acquires sorting information of the article. The sorting section sorts the article based on sorting possibility determination and the sorting information.

Hereinafter, an embodiment will be described with reference to the drawings.

Figure 1:
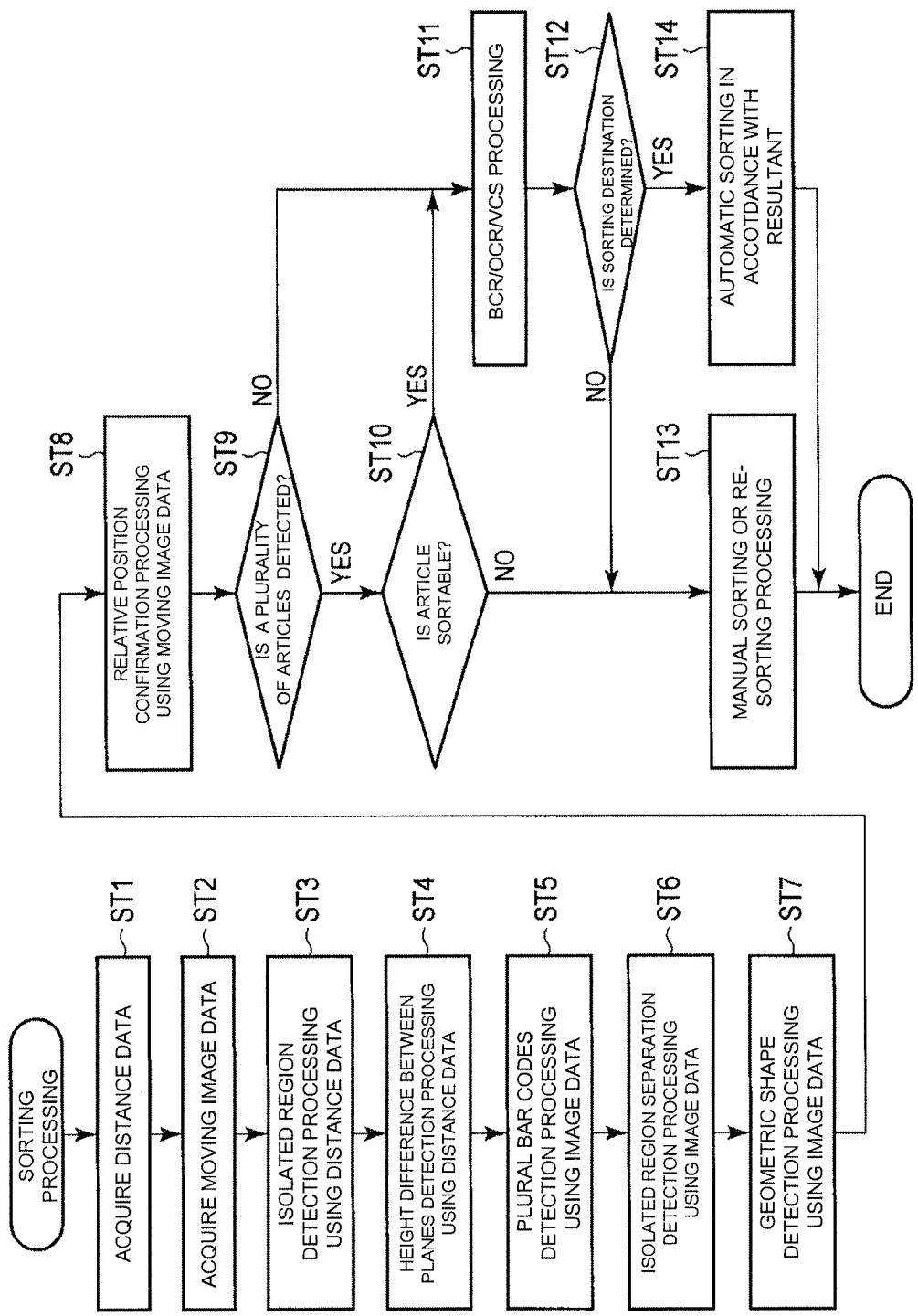
FIG. 1 shows a flow chart of an example of a sorting processing by a sorting system according an embodiment.
Figure 2:
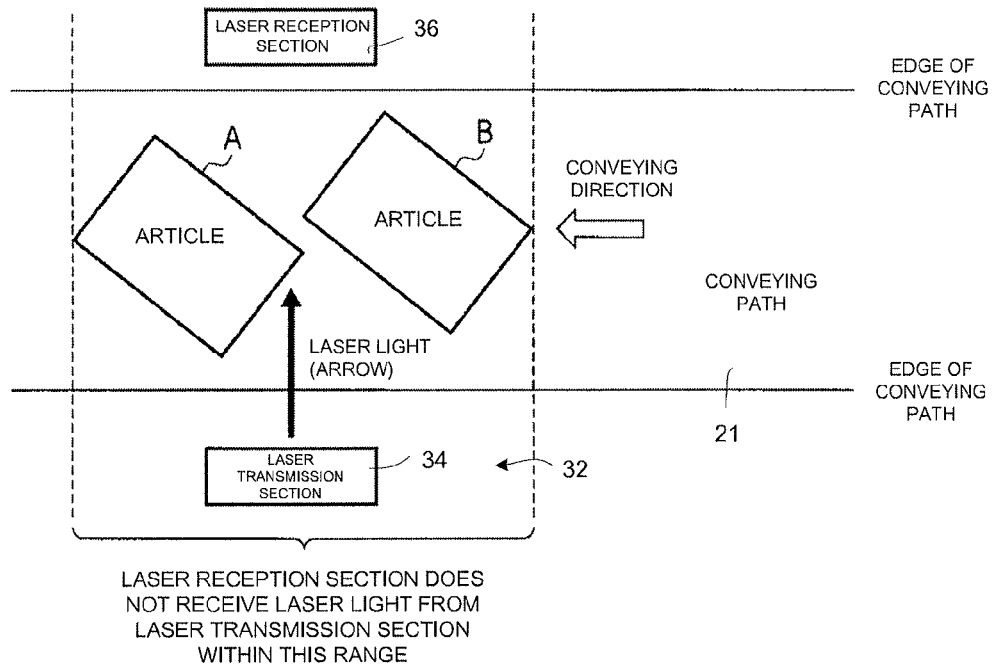
FIG. 2 is a diagram for describing an example of article detection by a transmission type sensor.
Figure 3:
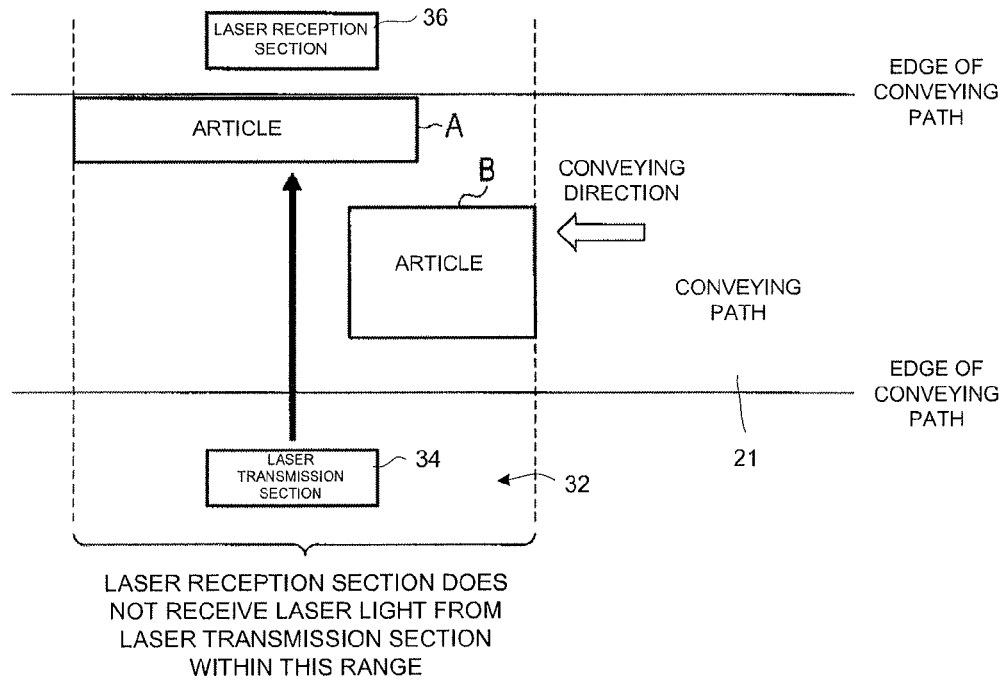
FIG. 3 is a diagram for describing an example of article detection by a transmission type sensor.
Figure 4:
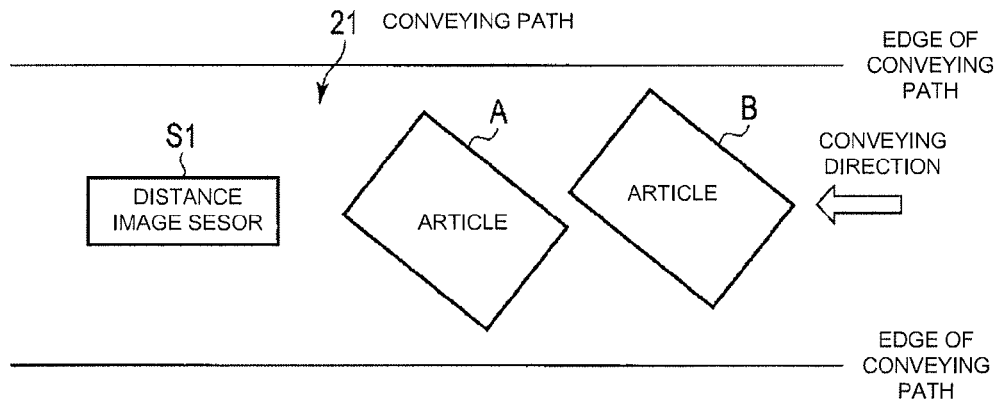
FIG. 4 is a diagram for describing an example of article detection by a distance image sensor of the sorting system according to the embodiment.

FIG. 1 shows a flow chart of an example of a sorting processing by a sorting system according an embodiment. FIGS. 2 and 3 are diagrams for describing an example of article detection by a transmission type sensor. FIG. 4 is a diagram for describing an example of article detection by a distance image sensor S1 of the sorting system according to the embodiment.

Figure 9:
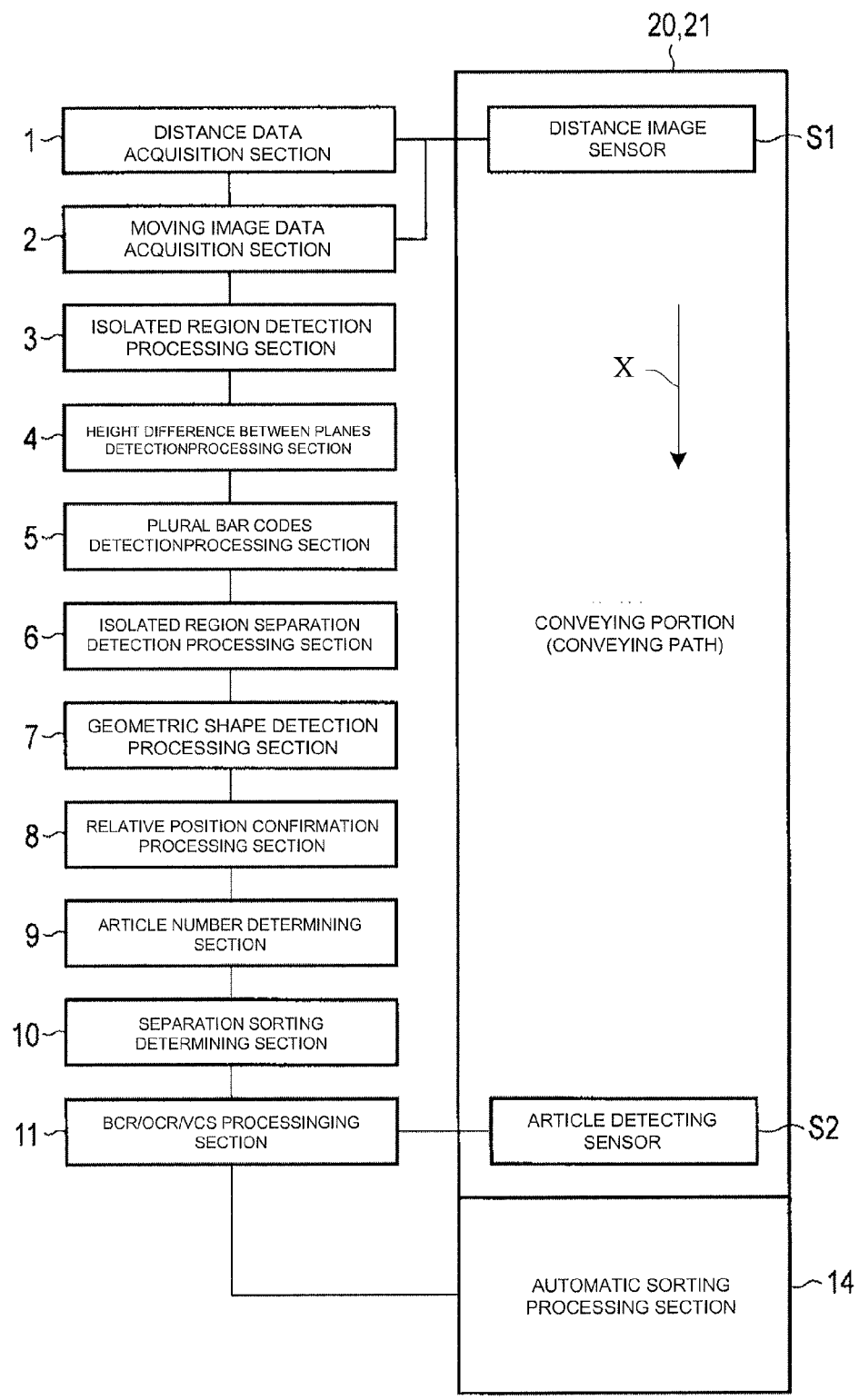
FIG. 9 shows an example of a schematic configuration of the sorting system according to the embodiment.

FIG. 9 is a diagram showing an example of a schematic configuration of a sorting system according to an embodiment. As shown in FIG. 9, the sorting system is provided with a distance image sensor S1, an article detecting sensor S2, a distance data acquisition section 1, a moving image data acquisition section 2, an isolated region detection processing section 3, a height difference between planes detection processing section 4, a plural bar codes detection processing section 5, an isolated region separation detection processing section 6, a geometric shape detection processing section 7, a relative position confirmation processing section 8, an article number determining section 9, a separation sorting determining section 10, a BCR (Bar-code recognition)/OCR(Optical character recognition)/VCS (Video coding system input) processing section 11, an automatic sorting processing section 14, a conveying portion (conveying section) 20, and the conveying path 21.

In FIG. 9, an article (not shown) that is a delivery object is conveyed in the direction of an arrow X by the conveying path 21. The distance image sensor S1 is provided at the upstream side of the conveying path 21, and the article detecting sensor S2 is provided at the downstream side of the conveying path 21. The distance image sensor S1 is connected to the distance data acquisition section 1 and the moving image data acquisition section 2. In addition, the article detecting sensor S2 is connected to the BCR/OCR/VCS processing section 11. At the later stage of the conveying path 21, the automatic sorting processing section 14 is provided. The automatic sorting processing section 14 sorts the article conveyed by the conveying path 21 into a prescribed sorting destination based on the output of the BCR/OCR/VCS processing section 11.

Hereinafter, a difference between the article detection by a transmission type sensor and the article detection by distance image sensor S1 of the sorting system according to the embodiment will be described. In addition, along with a flow chart shown in FIG. 1, an example of the sorting processing by the sorting system of the embodiment will be described.

As shown in FIG. 2, a transmission type optical sensor 32 has a laser transmission section 34 and a laser reception section 36 which are arranged via a conveying path 21. In the case in which an article A and an article B are conveyed at a narrow interval and obliquely in line, when the article A and the article B pass between the laser transmission section 34 and the laser reception section 36, the laser reception section 36 cannot receive the laser emitted by the laser transmission section 32 within the range shown by dotted lines. For the reason, the transmission type optical sensor 32 cannot recognize that a plurality of objects exists between the shown dotted lines.

Similarly, also when an article A and an article B are conveyed while they are arranged so as to partly overlap with each other as shown in FIG. 3, the transmission type optical sensor 32 cannot recognize that a plurality of objects exists between the shown dotted lines, for the same reason in the case of FIG. 2.

Next, the respective sections will be described.

To begin with, the distance image sensor (distance detecting section, photographing section) S1 will be described in detail. The distance image sensor S1 is installed above the conveying path 21 constituting the conveying portion 20 (conveying section) so as to photograph an upper face of an article (object) which is conveyed. The distance image sensor S1 photographs the article conveyed along the conveying direction by the conveying path 21 in the vertical direction and downwardly for the conveying path surface. In addition, a range where the distance image sensor S1 photographs is called a field of view, a photographing area or a detection area.

The distance image sensor S1 is installed at a position higher than an assumed maximum height of articles to be conveyed. It is desirable to install the distance image sensor S1 so that the both ends of the conveying path 21 in the direction orthogonal to the conveying direction are included in the field of view of the distance image sensor S1. As a support member for fixing the distance image sensor S1, an arch-shaped member with the both end portions fixed to the not movable portions of the sides of the conveying path 21, or a half-arch-shaped member with one end fixed thereto may be used.

The distance image sensor S1 acquires image data by photographing, and acquires distance data corresponding to the respective pixels composing the image data, based on the acquired image data. The distance data corresponds to a distance from the distance image sensor S1 to an object. That is, the distance image sensor S1 simultaneously acquires the image data and the distance data.

The distance data will be described in detail. The distance image sensor S1 acquires a point group which is composed of distance points each indicating a distance to a measurement object in the three-dimensional space. Here, this is called distance data. The density of the point group of the distance data to be acquired is different by the resolution of the distance image sensor S1. The acquired distance data includes distance data corresponding to an article (object) conveyed, and also includes distance data corresponding to one (object) other than the article conveyed. For example, the distance data corresponding to a part (object) of the conveying path 21 included in the range (photographing area) which the distance image sensor S1 captures is also acquired. An interval (timing) when the distance data is acquired corresponds to a frame rate of the distance image sensor S1.

The pixel of the image data is expressed by a density, and may be a color density of RGB or a density of a gray scale. An interval (timing) when the image data is acquired corresponds to a frame rate of the distance image sensor S1.

In addition, in the distance image sensor S1, a sensor for distance data acquisition (distance detecting section) and a sensor for image data acquisition (photographing section) may be separate units. Here, the distance image sensor S1 capable of simultaneously acquiring distance data and image data is used, as an example.

The distance data acquisition section 1 acquires from the distance image sensor S1, for an object within a photographing area, distance data which is composed of distance points each indicating a distance from the distance image sensor S1 to the object. An interval (timing) when the distance data acquisition section 1 acquires the distance data corresponds to a frame rate of the distance image sensor S1. For the reason, the distance data acquisition section 1 acquires the distance data of a plurality of continuous sets correspondingly to the frame rate within a fixed time, when an article conveyed passes through the photographing area.

The moving image data acquisition section 2 acquires time sequentially and continuously the image data obtained from the photographing area, from the distance image sensor S1. An interval when the moving image data acquisition section 2 acquires the image data corresponds to a frame rate of the distance image sensor S1. For the reason, the moving image data acquisition section 2 acquires the image data of a plurality of continuous sets correspondingly to the frame rate within a fixed time, when an article conveyed passes through the photographing area.

The isolated region detection processing section 3 executes an isolated region detection processing using the distance data. For example, the isolated region detection processing section 3, firstly for the point groups of the distance data, repeats coupling the point groups themselves which are close in position (point groups themselves which are three-dimensionally continuous), to perform classification. By this means, the continuous point group composed of portions whose heights are sharply different is divided as a different class.

Figure 5:
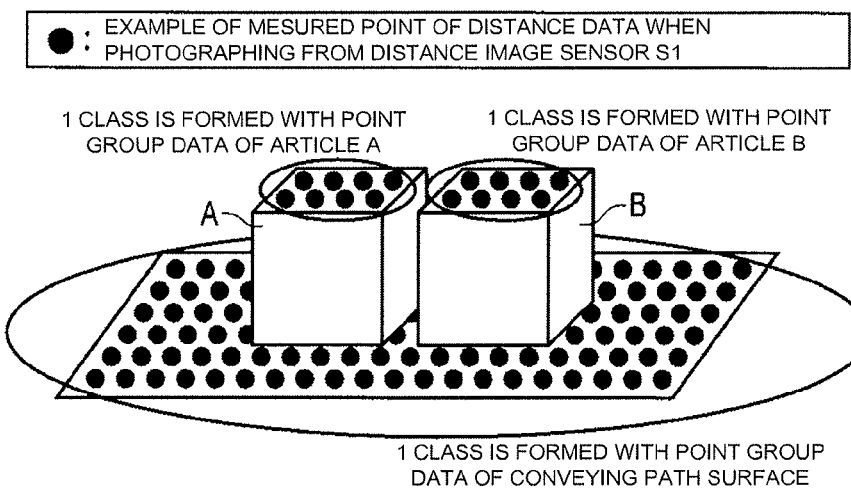
FIG. 5 shows an example of distance point group data and concept of class formation by the sorting system according to the embodiment.

For example, as shown in FIG. 5, the isolated region detection processing section 3 classifies a portion of the conveying path 21 where the measurement point group with a definite height is continuous into a first class, classifies an upper face portion of an article A where the measurement point group is continuous at a height different from the conveying path 21 into a second class, and classifies an upper face portion of an article B where the measurement point group is continuous at a height different from the conveying path 21 and the article A into a third class. Here, even if the height of the article A and the height of the article B are equal to or approximately equal to each other, unless the article A and the article B are extremely adjacent to each other, the point group of the article A and the point group of the article B are not located close to each other three-dimensionally. For the reason, the isolated region detection processing section 3 determines that the class of the point group of the article A is different from the class of the point group of the article B.

The isolated region detection processing section 3 connects the adjacent points, and performs classification based on the connected point group. That is, the isolated region detection processing section 3 classifies a plurality of the point groups in accordance with three-dimensional continuity of the point group. For the reason, even if an upper face of an article is a curved surface, or is bent in the middle, if the upper face is continuous and is keeping a definite height against the conveying path 21, the isolated region detection processing section 3 determines that those measurement point groups belong to the same class.

The isolated region detection processing section 3 detects one or a plurality of classes based on the three-dimensional position relation. When detecting a plurality of independent classes in the conveying path 21, the isolated region detection processing section 3 determines that a plurality of articles exists in the conveying path 21. In addition, the isolated region detection processing section 3 also detects a position of the class. Accordingly, the isolated region detection processing section 3 can detect the existence or non-existence of an article. In the processing in a later stage, the detection result of the position of the class is used as existence position information of the article.

Next, the height difference between planes detection processing section 4 executes a height difference between planes detection processing using the distance data. The height difference between planes detection processing section 4 performs plane detection using the height information. For example, the height difference between planes detection processing section 4 firstly approximates and applies a virtual small plane to a point group composed of a certain measurement point in the distance data and an adjacent measurement point in the distance data. Next, the height difference between planes detection processing section 4 calculates normal line directions of the virtual small planes, and classifies the point groups by the difference in the normal line directions of the virtual small planes composed of the respective point groups. The height difference between planes detection processing section 4 extracts the continuous region of the virtual small plane composed of the point group which has been classified into the same normal line direction as an actual plane. The height difference between planes detection processing section 4 estimates parameters of the plane, that is, they are a normal line direction and a distance from an original point, by a least square method, using the three-dimensional coordinate values of the point group in this region.

In addition, the height difference between planes detection processing section 4 receives height information of the conveying path 21 at the time of adjusting the distance image sensor S1. By this means, the height difference between planes detection processing section 4 can detect a plane, by excluding a plane of the height of the conveying path 21. In addition, when detecting a plurality of planes with different heights, the height difference between planes detection processing section 4 determines that a plurality of articles exists. Furthermore, the height difference between planes detection processing section 4 can also detect the position of an article. For example, even in the case of a plurality of articles conveyed while being contacted completely, if the heights of a plurality of the articles are different, the difference in these heights can be detected. The height difference between planes detection processing section 4 can recognize a plurality of these articles using the detection result of the difference in these heights. Accordingly, the height difference between planes detection processing section 4 can detect the existence or nonexistence of an article.

The plural bar codes detection processing section 5 executes a plural bar codes detection processing using the image data. The plural bar codes detection processing section 5 recognizes a bar code from the image data. The bar code may be a bar code of any kind. When recognizing a plurality of different bar codes from the same image, the plural bar codes detection processing section 5 can detect existence of a plurality of articles corresponding to this recognition result. Accordingly, the plural bar codes detection processing section 5 can detect the existence or non-existence of an article.

Figure 6:
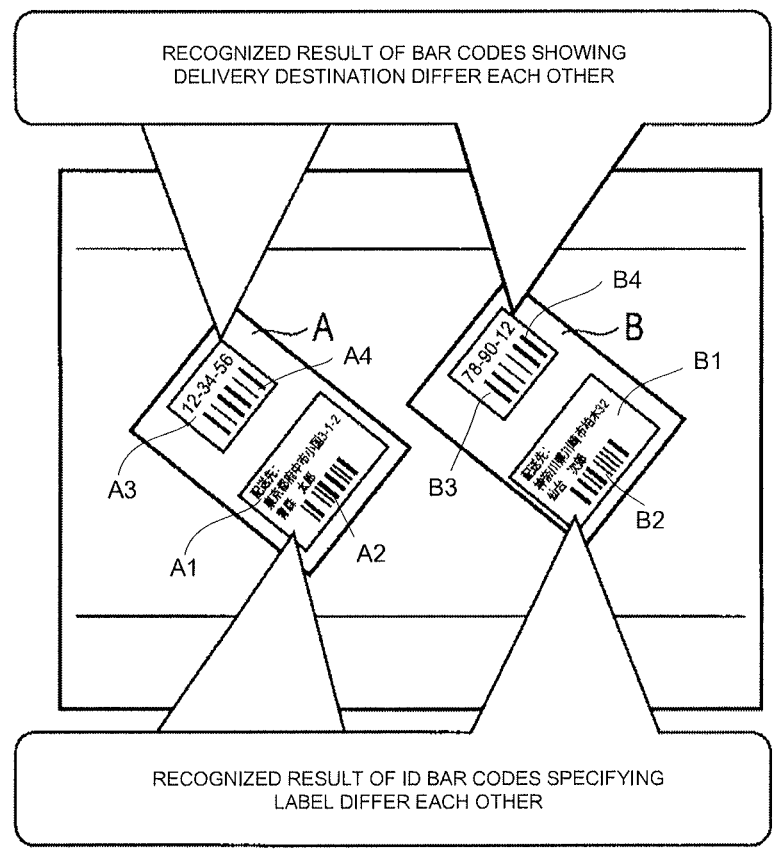
FIG. 6 shows an example of article detection by the difference between ID bar codes or the difference between delivery destination bar codes by the sorting system according to the embodiment.

For example, as shown in FIG. 6, if the decoding result of an ID bar code A2 indicating a customer code of a label A1 pasted on an article (article A) is different from the decoding result of an ID bar code B2 indicating a customer code of a label B1 pasted on another article (article B), the plural bar codes detection processing section 5 judges that a plurality of articles (article A and article B) is mixed in the same image.

Similarly, as shown in FIG. 6, if the decoding result of a bar code A4 indicating a delivery destination (delivery base) of a label A3 pasted on an article (article A) is different from the decoding result of a bar code B4 indicating a delivery destination (delivery base) of a label B3 pasted on another article (article B), the plural bar codes detection processing section 5 judges that a plurality of articles (article A and article B) is mixed in the same image.

In addition, a method to recognize a bar code from the image data is not particularly restricted. In the present embodiment, a case to recognize a bar code of a bar code system of Code128 from the image data will be described. The plural bar codes detection processing section 5 performs gray scale conversion of the image data, and binarizes it using an appropriate threshold value, to generate a binary image. The plural bar codes detection processing section 5 performs labeling, for the generated binary image, by connecting the portions of the pixel value 0 which are vertically and horizontally adjacent to each other. The plural bar codes detection processing section 5 extracts a portion where a plurality of regions having a height corresponding to a height of the bar of the bar code is arranged, based on the labeling result. The plural bar codes detection processing section 5 determines the thickness of a bar and the thickness of a blank from the size of each of the label regions, and decodes the bar code.

The isolated region separation detection processing section 6 executes an isolated region separation detection processing using the image data. The isolated region separation detection processing section 6 detects a region of the label isolated on the conveying path 21, based on the labeling result of the image data, as an existence position of an article conveyed. For example, a case in which the color image data has been acquired by the distance image sensor S1 will be described.

At the time of installing and adjusting the distance image sensor S1, a variation range in density value of the belt of the conveying path 21 in each of R, G, B is previously confirmed, and these variation ranges are set in a configuration file. That is, the isolated region separation detection processing section 6 has information indicating the variation range in density value of the belt of the conveying path 21 in each of R, G, B.

Figure 7:
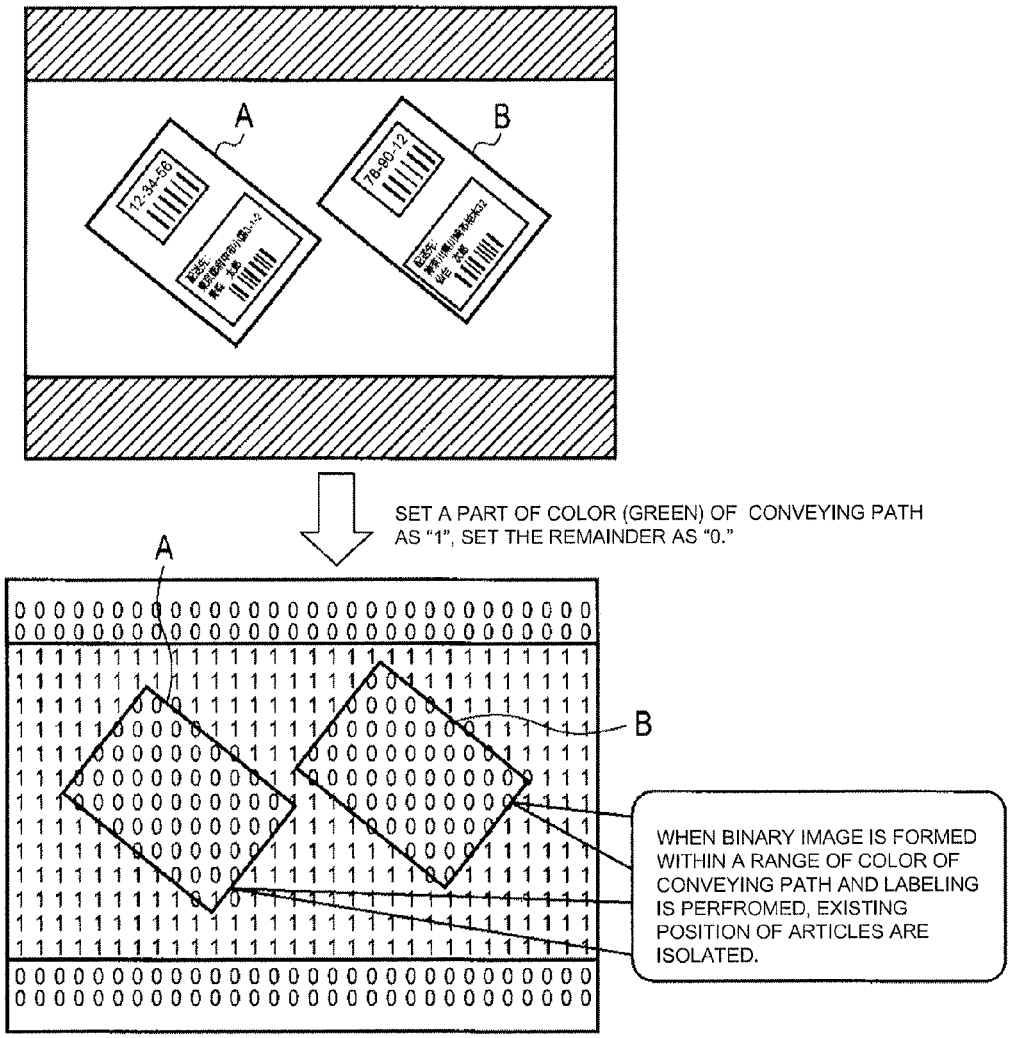
FIG. 7 shows an example of an isolated region separation detection processing based on the image data by the sorting system according to the embodiment.

As shown in FIG. 7, for example, the isolated region separation detection processing section 6, using the configuration file, for the image data acquired by the distance image sensor S1, sets one which is within a specified color range of the conveying path 21 to 1, and sets the other one to 0, and then generates a binary image by binarization. The isolated region separation detection processing section 6, for the generated binary image, when the portions of 1 are adjacent to each other in the vertical and horizontal pixels, performs labeling to connect the adjacent pixels. The isolated region separation detection processing section 6 determines the pixel group connected by labeling as a region of the conveying path 21. When detecting a blank region (0 data) having not less than a definite size which is isolated in the region of the conveying path 21, the isolated region separation detection processing section 6 judges that an article exists in this isolated blank region. When detecting a plurality of the isolated blank regions, the isolated region separation detection processing section 6 detects a plurality of these blank regions as a plurality of articles. In addition, the isolated region separation detection processing section 6 can also detect a position of an article, based on the detection result of the isolated blank region. Accordingly, the isolated region separation detection processing section 6 can detect the existence or nonexistence of an article.

In addition, as another approach, the isolated region separation detection processing section 6 performs clustering of the color information of the image data into a plurality of classes. When a region of an isolated class exists within the range of the conveying path 21, the isolated region separation detection processing section 6 can also determine the region of the isolated class as an article.

The geometric shape detection processing section 7 executes a geometric shape detection processing using the image data. The geometric shape detection processing section 7 extracts an article edge and so on existing in the image, and determines the article edge (two-dimensional geometric figure) which satisfies a geometric constraint condition as an article.

An example of a geometric shape detection processing to detect an article of a rectangular solid will be described. The geometric shape detection processing section 7 performs gray scale conversion for the image data, and extracts a portion where the density values of horizontally and vertically adjacent pixels are not less than a fixed value, as a candidate for an edge constituting point. The geometric shape detection processing section 7 detects a straight line using Hough conversion for the candidate group for an edge constituting point. When a plurality of straight lines are obtained, the geometric shape detection processing section 7 determines whether a combination of intersection points of the straight lines is proper as a rectangular solid. For the judgment whether or not proper, angles at the four corners and lengths of the four sides and so on of a quadrangle constituted by employed four intersection points are used. In addition, after detecting the straight lines, the geometric shape detection processing section 7 verifies whether or not the density values of the original image of an article near the edge are fixed, and can determine whether or not it is a rectangular solid from the verification result. When detecting a plurality of geometric figures which satisfy the condition of a rectangular solid, the geometric shape detection processing section 7 detects a plurality of these geometric figures as a plurality of articles. In addition, the geometric shape detection processing section 7 can also detect a position of an article based on the detection result of the geometric figure satisfying the condition. Accordingly, the geometric shape detection processing section 7 can detect the existence or nonexistence of an article.

In addition, in any of the isolated region detection processing section 3 using the above-described distance data, the height difference between planes detection processing section 4 using the distance data, the plural bar codes detection processing section 5 using the image data, the isolated region separation detection processing section 6 using the image data, the geometric shape detection processing section 7 using the image data, data at any time may be used out of a plurality of distance data and image data which are continuously obtained at fixed intervals.

Figure 8:
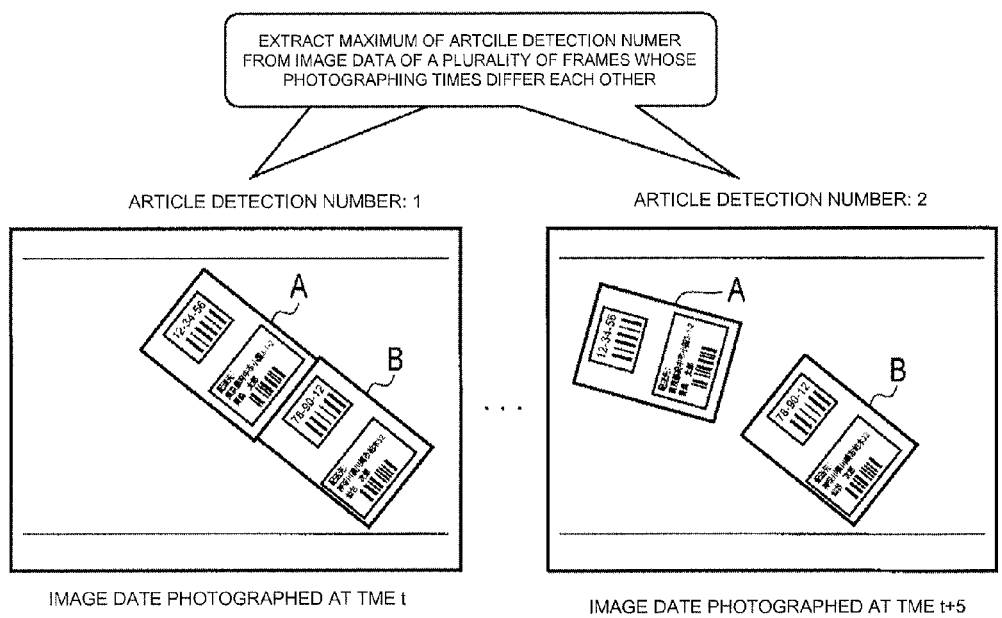
FIG. 8 shows an example of a relative position confirmation processing based on the moving image data by the sorting system according to the embodiment.

The relative position confirmation processing section 8 executes a relative position confirmation processing using the moving image data (time sequential image data). The relative position confirmation processing section 8 confirms the change in the relative position relation of articles from the time sequential image data group. The object which is being conveyed slides on a conveying belt or a conveying roller, or collides with the edge of the conveying path 21, as shown in FIG. 8, and thereby the position thereof may be displaced during conveyance. Even under the condition in which such a position displacement is generated, the detection accuracy of a plurality of articles can be enhanced by the relative position confirmation processing.

In addition, the isolated region detection processing section 3 using the above-described distance data, and the height difference between planes detection processing section 4 using the distance data compose an article detecting section for detecting one or a plurality of articles based on the distance data.

In addition, the plural bar codes detection processing section 5 using the image data, the isolated region separation detection processing section 6 using the image data, the geometric shape detection processing section 7 using the image data, and the relative position confirmation processing section 8 compose an article detecting section for detecting one or a plurality of articles based on the image data.

The article number determining section 9 determines the number of the detected articles. For example, the article number determining section 9 determines the number of the article based on the processed result by the detection processing section using any of the above-described image data, from the image at an earlier photographing time in order, that is, the number of the detected articles. For the above-described reason, the detection number of articles may increase or decrease at a specified frame as a boundary. In this case, a state in which the articles are separated is judged as an optimum state. That is, the article number determining section 9 employs the result in which the articles are most detected. By this means, the amount of the articles can be determined with a higher accuracy. In addition, the article number determining section 9 may use the processing result by the detection processing section using the distance data. The article number determining section 9 may use the processing result by both the detection processing section using the image data, and the detection processing section using the distance data.

The separation sorting determining section 10 determines whether or not a separation sorting mechanism (not shown) of the automatic sorting processing section 14 can performs separation sorting of a plurality of articles. That is, the separation sorting determining section 10 determines whether or not it is possible to sort the articles into the respective proper sorting destinations (for example, shooters) under the control of the separation sorting mechanism without intervention of manpower.

For example, when a plurality of articles exist in positions extremely close to each other, it is difficult for the separation sorting mechanism to sort (move) the respective articles separately. For the reason, based on the position relation of a plurality of the articles, when the position relation of a plurality of the articles is not more than a definite threshold value, the separation sorting determining section 10 judges it difficult that the separation sorting mechanism sorts (moves) the respective articles separately. That is, when the distance between a plurality of articles is not more than a prescribed length, the separation sorting determining section 10 determines that the separation sorting mechanism cannot sort the plurality of articles separately. This determination is called a sorting impossibility determination. In this case, the conveying portion 20 stops conveying an article.

For example, when the position relation between a plurality of articles is larger than a definite threshold value, the separation sorting determining section 10 determines that the separation sorting mechanism can sort (move) the plurality of articles separately. This determination is called a sorting possibility determination.

The separation sorting determining section 10 is determining section for determining whether a plurality of articles is sortable.

The BCR/OCR/VCS processing section 11 executes a BCR/OCR/VCS processing, based on the image data from at least one of the image data from the distance image sensor (photographing section) S1, and the image data from the article detecting sensor (photographing section) S2 installed at the conveying path 21. However, when the image data from the distance image sensor S1 has a resolution sufficient for any one processing out of the BCR processing, the OCR processing and the VCS processing, it is not necessary to prepare the article detecting sensor S2, and the image data acquired by the distance image sensor S1 may be used for the BCR/OCR/VCS processing without change.

It is not necessary to apply a specific method for any of the BCR processing, the OCR processing and the VCS processing.

The BCR/OCR/VCS processing section 11 is an acquisition section for acquiring sorting information of an article. The BCR processing of the BCR/OCR/VCS processing section 11 recognizes a bar code of an article, determines the recognized bar code, and specifies sorting information. As a specific example of the BCR processing, when the BCR processing uses the image data, a bar code recognition method using the above-described labeling result can be applied to the BCR processing. Or, when the article detecting sensor S2 is a bar code recognition device of a laser type, a general recognition method by a laser may be applied to the BCR processing.

The BCR/OCR/VCS processing section 11 recognizes the character information (address information) from the image data, by an OCR processing, collates the recognized address with an address database, and specifies an address (sorting information) of a delivery destination (address) of an article. For example, the arts described such as "Japanese Patent Application Publication No. 2011-125860," and "Japanese Patent Application Publication No. 2005-301477" can be applied to the OCR processing of the BCR/OCR/VCS processing section 11. The OCR processing is applied to only an article which cannot be recognized in the BCR processing of the former stage as a target, and thereby it is also possible to improve efficiency of the processing.

The BCR/OCR/VCS processing section 11 displays the image data on a display, and specifies the address (sorting information) of a proper delivery destination (address) of an article, based on the address inputted with a keyboard by an operator who has visually recognized the address from the displayed image, by the VCS processing. For example, the art of "Japanese Patent Application Publication No. 2010-9410" can be applied to the VCS processing of the BCR/OCR/VCS processing section 11. The VCS processing is applied to only an article which cannot be recognized in the BCR processing and the OCR processing of the former stage as a target, and thereby it is also possible to improve efficiency of the processing.

After the BCR/OCR/VCS processing is completed, the automatic sorting processing section 14 receives the recognition result (sorting information) of the BCR/OCR/VCS processing from the BCR/OCR/VCS processing section 11, and performs a confirmation processing of the sorting destination.

The article detecting sensor (photographing section) S2 is an image sensor, for example. If the resolution of the image data from the distance image sensor S1 is sufficient for the BCR/OCR/VCS processing of the BCR/OCR/VCS processing section 11, the article detecting sensor S2 may not be provided. In addition, the article detecting sensor S2 may be a bar code recognition device of a laser type. In addition, the article detecting sensor S2 performs photographing an article using the existence or nonexistence information of an article by the detection processing sections 3-7, or the article processing section 9.

When the separation sorting determining section 10 determines the sorting possibility determination, the automatic sorting processing section 14 performs a confirmation processing of a sorting destination which determines a sorting destination of an article in the automatic sorting processing section 14, based on the recognition result (specified sorting information) of the BCR/OCR/VCS processing section 11, using the database of a previously defined correspondence table between the sorting information and a sorting destination. When the sorting destination is determined, the automatic sorting processing section 14 automatically sorts an article of the object (article which is conveyed), based on the determined sorting destination. That is, the automatic sorting processing section 14 is a sorting section for sorting an article based on the sorting possibility determination and the sorting information.

In the present embodiment, the sorting system has a CPU, a ROM, a RAM, an external storage device, a display device, a keyboard, and so on, similarly as a general computer, for example. The ROM, for example, stores program for realizing the respective functions of the distance data acquisition section 1, the moving image data acquisition section 2, the isolated region detection processing section 3, the height difference between planes detection processing section 4, the plural bar codes detection processing section 5, the isolated region separation detection processing section 6, the geometric shape detection processing section 7, the relative position confirmation processing section 8, the article number determining section 9, the separation sorting determining section 10, the BCR/OCR/VCS processing section 11. The CPU executes the program stored in the ROM, to realize the above-described respective functions. Accordingly, the respective functions are realized by executing the program by the CPU.

Next, an example of a sorting processing will be described with reference to FIG. 1. FIG. 1 shows a flow chart of an example of a sorting processing of the sorting system according to the embodiment.

The distance data acquisition section 1 acquires, from the distance image sensor S1, time sequentially and continuously the distance data which is composed of distance points each indicating a distance from the distance image sensor S1 to an article, a conveying path, and so on, in the photographing area (detection area) (ST1).

Furthermore, the moving image data acquisition section 2 acquires time sequentially and continuously the image data within the photographing area from the distance image sensor S1 (ST2).

Next, the isolated region detection processing section 3 executes the isolated region detection processing using the distance data (ST3).

The isolated region detection processing section 3 detects one or a plurality of classes based on the three-dimensional position relation. When detecting a plurality of independent classes in the conveying path 21, the isolated region detection processing section 3 determines that a plurality of articles exists on the conveying path 21. In addition, the isolated region detection processing section 3 also detects a position of the class. In the processing in the later stage, the position of the class of the detection result is used as existence position information of the article.

Next, the height difference between planes detection processing section 4 executes the height difference between planes detection processing using the distance data (ST4). The height difference between planes detection processing section 4 performs the plane detection using the height information.

When detecting a plurality of planes with different heights, the height difference between planes detection processing section 4 determines that a plurality of articles exist. Furthermore, the height difference between planes detection processing section 4 also detects the position of an article. The height difference between planes detection processing section 4 recognizes a plurality of these articles using the detection result of the difference in these heights.

Next, the plural bar codes detection processing section 5 executes the plural bar codes detection processing using the image data (ST5). When recognizing a plurality of different bar codes within the same image, the plural bar codes detection processing section 5 detects existence of a plurality of articles corresponding to this recognition result.

Next, the isolated region separation detection processing section 6 executes the isolated region separation detection processing using the image data (ST6). The isolated region separation detection processing section 6 detects the region of the label isolated on the conveying path 21, based on the labeling result of the image data, as the existence position of an article which is conveyed.

When detecting a plurality of the isolated blank regions, the isolated region separation detection processing section 6 detects a plurality of these blank regions as a plurality of articles. In addition, the isolated region separation detection processing section 6 can also detect a position of an article, based on the detection result of the isolated blank region.

Next, the geometric shape detection processing section 7 executes the geometric shape detection processing using the image data (ST7). The geometric shape detection processing section 7 extracts an article edge and so on existing in the image, and determines the article edge (two-dimensional geometric figure) which satisfies the geometric constraint condition as an article.

The geometric shape detection processing section 7 detects also a position of the article based on the detection result of the geometric figure satisfying the condition.

In addition, in any of the isolated region detection processing ST3 using the above-described distance data, the height difference between planes detection processing ST4 using the distance data, the plural bar codes detection processing ST5 using the image data, the isolated region separation detection processing ST6 using the image data, the geometric shape detection processing ST 7 using the image data, data at any time may be used out of a plurality of distance data and image data which are continuously obtained at fixed times.

Next, the relative position confirmation processing section 8 executes a relative position confirmation processing using the moving image data (time sequential image data group) (ST8). The relative position confirmation processing section 8 confirms the change in the relative position relation of the articles from the time sequential image data group.

The article number determining section 9 determines the number of the detected articles and confirms whether or not a plurality of articles has been detected (ST9).

When a plurality of articles is not detected (ST9, NO), but only one article is detected, the BCR/OCR/VCS processing section 11 executes the BCR/OCR/VCS processing (ST11). In the BCR/OCR/VCS processing, at least one processing out of the BCR processing, the OCR processing and the VCS processing is executed. The BCR processing recognizes a bar code of an article, and specifies sorting information of the article based on the recognized bar code. The OCR processing recognizes character information (address information) of an article from the image data, and specifies an address (sorting information) of a destination of the article based on the recognized character information and so on. The VCS processing displays a video image of an article, and specifies the address (sorting information) of the destination of the article inputted by an operator who has visually confirmed the address of the destination from the video image. The OCR processing is applied to only an article which cannot be recognized in the BCR processing of the former stage as a target, and thereby the OCR processing can also improve efficiency of the processing. In addition, the VCS processing is applied to only an article which cannot be recognized in the BCR processing and the OCR processing of the former stage as a target, and thereby the VCS processing can also improve efficiency of the processing.

However, since in the BCR processing, and the OCR processing of a plurality of articles, difficulty increases in terms of recognition accuracy and in terms of processing speed, an operation to shift the processing to the VCS processing by omitting the BCR processing and the OCR processing is also enabled.

When a plurality of articles are detected (ST9, YES), the separation sorting determining section 10 determines whether or not a separation sorting mechanism (not shown) of the automatic sorting processing section 14 can perform separation sorting of a plurality of the articles (ST10). That is, the separation sorting determining section 10 determines whether or not the articles can be sorted into the proper respective sorting destinations by the control of the separation sorting mechanism without intervention of manpower.

When the separation sorting determining section 10 determines that the article is sortable (ST10, YES), the BCR/OCR/VCS processing section 11 executes the BCR/OCR/VCS processing (ST11).

When the separation sorting determining section 10 determines the article is not sortable (ST10, NO), the processing is shifted to a manual sorting or a re-sorting processing (ST13).

The BCR/OCR/VCS processing outputs the recognition result (sorting information) for the respective articles (ST11). The automatic sorting processing section 14 executes confirmation processing of the sorting destination to determine sorting destination for the respective articles, based on the sorting information from the BCR/OCR/VCS processing section 11 (ST12). When the sorting destination is determined (ST12, YES), the automatic sorting processing section 14 executes an automatic sorting processing, in accordance with the sorting possibility determination by the separation sorting determining section 10, and the determined sorting destination (ST14). That is, the automatic sorting processing section 14 controls the separation sorting mechanism, and sorts the article conveyed to the sorting destination (shooter) corresponding to the sorting information. On the other hand, when the automatic sorting processing section 14 cannot determine the sorting destination of an article because the BCR/OCR/VCS processing section 11 cannot specify the sorting information (ST12, NO), the automatic sorting processing section 14 stops (suspends) the automatic sorting processing. In this case, the conveying portion 20 stops (suspends) conveying the article, and a manual sorting or a re-sorting processing (ST13) is executed.

In addition, even when receiving the sorting impossibility determination from the separation sorting determining section 10, in the former stage of the BCR/OCR/VCS processing, the automatic sorting processing section 14 stops (suspends) the automatic sorting processing. In this case, the conveying portion 20 stops (suspends) conveying an article, and manual sorting or re-sorting processing is performed.

In the above-described manual sorting or re-sorting processing, an article whose sorting destination cannot be designated is manually sorted, or an interval between articles is increased and the sorting processing is performed again. Regarding which one to select, one which is advantageous for the operation of the sorting system may be selected.

The automatic sorting processing section 14 determines the sorting destination of an article, based on the sorting possibility determination and the recognition result (determination result of sorting destination), using the database of a previously defined correspondence table between a recognition result (sorting information) and a sorting destination. In addition, the automatic sorting processing section 14 automatically sorts the article of the object (article to be conveyed), based on the determination result of the sorting destination.

In addition, the processing related to the above-described distance data can be operated alone, and similarly, the processing related to the image data can also be operated alone. In addition, whether or not a plurality of articles has been detected can be determined, by using at least one processing, out of the isolated region detection processing using the distance data, the height difference between planes detection processing using the distance data, the plural bar codes detection processing using the image data, the isolated region separation detection processing using the image data, the geometric shape detection processing using the image data, the relative position confirmation processing using the moving image data.

There is no restriction in the execution order among the above-described processings. In addition, regarding the BCR/OCR/VCS processing, not all of the BCR processing, the OCR processing and the VCS processing are required, and it is possible to specify the delivery destination by at least one processing. In addition, regarding the BCR processing, the OCR processing and the VCS processing, the execution order among the respective processing is not restricted.

Hereinafter, the above-described sorting system will be summarized.

(1) The sorting system has the section (the conveying portion 20) which conveys an object to be sorted for each delivery destination, the section (the distance image sensor S1, the sensor for distance data acquisition) which can continuously acquire the distance data from above the conveying path, the section (the isolated region detection processing section 3, the height difference between planes detection processing section 4) which determining the existence or nonexistence of the article conveyed using the above-described acquired distance data, the section (the article detecting sensor S2) which photographs the article by a scanner which is prepared separately at the downstream side of the conveying path using the detected existence or nonexistence information, the section (the BCR/OCR/VCS processing section 11) which recognizes the delivery destination based on the image data of the article photographed by the scanner, and the section (the automatic sorting processing section 14) which conveys the article to the designated sorting destination in accordance with the recognition result.

(2) In addition, in the sorting system, when the section which detects the existence or nonexistence of the article conveyed using the distance data of the above-described (1) connects the distance measurement point group data locating at the height of the conveying path, the section detects the isolated region of the point group data composed of the data at a height different from the conveying path, as the existence position of the article conveyed, and thereby detects a plurality of the articles conveyed.

(3) In addition, in the sorting system, when the section which detects the existence or nonexistence of the article conveyed using the distance data of the above-described (1) performs plane approximation of the distance measurement point group, the section detects that a plurality of planes with different heights exists except the conveying path plane, and thereby detects a plurality of the articles conveyed.

(4) In addition, in the sorting system, the section which recognizes the delivery destination based on the image data of the article photographed by the scanner of the above-described (1) specifies the delivery destination (sorting information) based on the information of the bar code.

(5) In addition, in the sorting system, the section which recognizes the delivery destination based on the image data of the article photographed by the scanner of the above-described (1) specifies the delivery destination (sorting information) based on the result of the image recognition of the delivery destination address.

(6) In addition, in the sorting system, the section which recognized the delivery destination based on the image data of the article photographed by the scanner of the above-described (1), transfers the image data to a working PC, and an operator inputs the delivery destination based on an image displayed on a display of the working PC, to specify the delivery destination (sorting information).

(7) In addition, the sorting system, using the data which is obtained by continuously acquiring the distance data of the above-described (1), when the relative position of the detection planes between a plurality of the data at different photographing times displaces, judges that a plurality of the articles conveyed exists.

(8) The sorting system has the section (the conveying portion 20) which conveys an object to be sorted for each delivery destination, the section (the distance image sensor S1, the sensor for image data acquisition) which can continuously acquire the image data from above the conveying path, the section (the plural bar codes detection processing section 5, the isolated region separation detection processing section 6, the geometric shape detection processing section 7, the relative position confirmation processing section 8) which detects the existence or nonexistence of the article conveyed using the acquired image data, the section (the article detecting sensor S2) which photographs the article by a scanner which is prepared separately at the downstream side of the conveying path using the detected existence or nonexistence information, the section (the BCR/OCR/VCS processing section 11) which recognizes the delivery destination based on the image data of the article photographed by the scanner, and the section (the automatic sorting processing section 14) which conveys the article to the designated sorting destination in accordance with the recognition result.

(9) In addition, in the sorting system, the section which detects the existence or nonexistence of the article conveyed using the acquired image data of the above-described (8) detects that a plurality of bar codes indicating different articles exist in the acquired image data, and thereby detects a plurality of the articles conveyed.

(10) In addition, in the sorting system, the section which detects the existence or nonexistence of the article conveyed using the acquired image data of the above-described (8) performs labeling using the density information of the acquired image data, and detects the isolated one with a specified size out of the labels except the label of the conveying path, and thereby detects a plurality of the articles conveyed.

(11) In addition, in the sorting system, the section which detects the existence or nonexistence of the article conveyed using the acquired image data of the above-described (8) extracts the specific two-dimensional geometric figure from the data which is obtained by processing the acquired image data, and thereby detects a plurality of the articles conveyed.

(12) In addition, the sorting system, using the acquired image data of the above-described (8) which is obtained by continuously acquired, out of a plurality of the acquired image data at different photographing times, when the detection number of the articles conveyed increase or decreases at a specific frame as a boundary, employs one in which the detection number is largest, and determines the number of the articles conveyed.

(13) In addition, the sorting system is a home delivery service sorting system characterized in that the section which recognizes the delivery destination based on the image data of the article photographed by the scanner of the above-described (8) recognizes the delivery destination by at least any one section of the above-described (4)-(6).

(14) In addition, the sorting system, when the resolution which can specify the delivery destination can be acquired in the acquired image data of the above-described (8), sorts the article conveyed without using the scanner.

(15) In addition, when a plurality of the articles to be conveyed are detected in the above described (1)-(3) and (8)-(12), and when judging it impossible to control so that the respective objects are conveyed to the separate sorting destinations due to the mechanism control constraint, the sorting system controls so that the objects are manually sorted without using the delivery destination recognizing (specifying) section.

(16) In addition, in place of the manual sorting of the above-described (15), the sorting system temporarily records the detection information of a plurality of objects, holds an interval between the articles at a controllable interval based on the record, and makes the sorting processing to be performed again.

(17) In addition, the sorting system detects the passage information of the article to be conveyed using the transmission type sensor together, in addition to the section of the above-described (1)-(16), and narrows the data acquisition range based on the passage information.

According to the above-described sorting system, when an interval between a plurality of home delivery articles is narrow, even if the arrangement thereof is special, it is possible to properly detect the existence or nonexistence of a plurality of the home delivery articles. In addition, the erroneous sorting can be reduced as the result. Moreover, computation resources can be efficiently used because wasteful recognition processing is not performed.

While a certain embodiment has been described, this embodiment has been presented by way of example only, and is not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A sorting system, comprising:
a conveying section which conveys an article;
a photographing section which photographs, from above the conveying section, a photographing area including an area through which the article conveyed by the conveying section passes, to acquire image data;
an article detecting section which detects one or a plurality of the articles based on the image data;
a determining section which determines, when a plurality of the articles are detected, whether the plurality of the articles are sortable; and
an acquisition section which acquires sorting information of the article; sorting section which sorts the article based on sorting possibility determination and the sorting information, wherein the article detecting section detects one or a plurality of the articles from a labeling processing result based on density information of the image data.

2. A sorting system, comprising:
a conveying section which conveys an article;
a photographing section which photographs, from above the conveying section, a photographing area including an area through which the article conveyed by the conveying section passes, to acquire image data;
an article detecting section which detects one or a plurality of the articles based on the image data;
a determining section which determines, when a plurality of the articles are detected, whether the plurality of the articles are sortable;
an acquisition section which acquires sorting information of the article;
a sorting section which sorts the article based on sorting possibility determination and the sorting information; and
an article number determining section;
wherein the photographing section photographs a plurality of the image data at different timings, wherein the article detecting section detects one or a plurality of the articles based on the respective image data, and the article number determining section determines the maximum number of the detected articles based on the number of the articles which the article detecting section detected, and outputs a determination result.

* * * * *